US008887252B2

(12) United States Patent
Ohmori et al.

(10) Patent No.: US 8,887,252 B2
(45) Date of Patent: Nov. 11, 2014

(54) INFORMATION PROVIDING SYSTEM AND DESIGN INFORMATION PROVIDING SERVER

(75) Inventors: Motoji Ohmori, Osaka (JP); Shunji Ohara, Osaka (JP); Takashi Katayama, Osaka (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 13/369,357

(22) Filed: Feb. 9, 2012

(65) Prior Publication Data

US 2012/0143764 A1 Jun. 7, 2012

Related U.S. Application Data

(62) Division of application No. 12/095,981, filed as application No. PCT/JP2006/323738 on Nov. 28, 2006, now Pat. No. 8,151,331.

(30) Foreign Application Priority Data

Dec. 7, 2005 (JP) ................. 2005-354053

(51) Int. Cl.
*H04L 29/00* (2006.01)
*H04L 9/08* (2006.01)
*H04L 9/32* (2006.01)
*G06Q 10/10* (2012.01)
*G06Q 50/04* (2012.01)

(52) U.S. Cl.
CPC .......... *G06Q 10/10* (2013.01); *H04L 2209/603* (2013.01); *H04L 9/0891* (2013.01); *H04L 9/3263* (2013.01); *G06Q 50/04* (2013.01)
USPC .......................................... 726/6

(58) Field of Classification Search
None
See application file for complete search history.

(56) References Cited

U.S. PATENT DOCUMENTS 5,991,751 A 11/1999 Rivette et al.
7,243,311 B2 * 7/2007 Mabuchi et al. ................ 716/54

(Continued)

FOREIGN PATENT DOCUMENTS

JP 2001-222734 8/2001
JP 2002-132996 5/2002

(Continued)

OTHER PUBLICATIONS

Japan Federation of Gyoseishoshi Lawyers Associations (JP 2002-132996, May 10, 2002).*

(Continued)

*Primary Examiner* — Jeffrey Pwu
*Assistant Examiner* — Helai Salehi
(74) *Attorney, Agent, or Firm* — Wenderoth, Lind & Ponack, L.L.P.

(57) ABSTRACT

A design information providing system, which does not allow continuation of manufacturing of products unless a patent license contract is concluded, includes a terminal apparatus (40a) of a user manufacturing a product (BD player (50)) and includes a patent license issuing server (20a) issuing, to the terminal apparatus (40a), a contract certificate (60) certifying the conclusion of the contract, when a contract for a license necessary for manufacturing the BD player (50) is concluded with the user of the terminal apparatus (40a). Further, the design information providing system includes a design information providing server (an encryption key issuing server (30a)) transmitting an encryption key (80) to the terminal apparatus (40a) on condition of the confirmation of the contract certificate (60), when a request for design information (encryption key (80)) unique to the BD player (50) is transmitted from the terminal apparatus (40a).

8 Claims, 15 Drawing Sheets

(56) References Cited

U.S. PATENT DOCUMENTS

| | | |
|---|---|---|
| 7,565,691 B2 | 7/2009 | Kitani |
| 7,940,932 B2 * | 5/2011 | Paksoy et al. ............ 380/247 |
| 2005/0097055 A1 | 5/2005 | Kanamori et al. |
| 2005/0108039 A1 | 5/2005 | Kanamori et al. |
| 2005/0198529 A1 | 9/2005 | Kitani |

FOREIGN PATENT DOCUMENTS

| | | |
|---|---|---|
| JP | 2005-107878 | 4/2005 |
| JP | 2005-252866 | 9/2005 |
| JP | 2005-268931 | 9/2005 |
| WO | 2005/088900 | 9/2005 |

OTHER PUBLICATIONS

International Search Report issued Mar. 6, 2007 in the International (PCT) Application of which parent U.S. Appl. No. 12/095,981 is the U.S. National Stage.

Natsume Matsuzaki et al., "DVD Content Scramble System," National Technical Report, vol. 43, $3^{rd}$ Issue, Engineering Administration Center, Jun. 1997, pp. 118-122, with English Abstract and partial English translation.

* cited by examiner

FIG. 14

| Contractors list ||
|---|---|
| Licensor name (101) | AAA LTD |
| Target patent (102) | JP-BBB |
| | US-CCC |
| | ⋮ |
| Licensee name (103) | DDD LTD |
| | EEE LTD |
| | ⋮ |

100

US 8,887,252 B2

INFORMATION PROVIDING SYSTEM AND DESIGN INFORMATION PROVIDING SERVER

This application is a divisional of U.S. application Ser. No. 12/095,981, filed Jun. 3, 2008, now U.S. Pat. No. 8,151,331 which is a national stage application of International application No. PCT/JP2006/323738, filed Nov. 28, 2006.

TECHNICAL FIELD

The present invention relates to a design information providing system and a design information providing server, and particularly to a technique for providing design information that is unique to products manufactured by users.

BACKGROUND ART

As FIG. 1 shows, for example, for existing DVD-Videos, license contracts are concluded under the DVD Consortium for each of the following categories: formats, encryption keys, and patents.

Here, the formats include, for example, a specification in which the physical structure of a disc, the structure of the data to be recorded on the disc, and so on are described.

In addition, in order to prevent general users from making casual copies using computers, the DVD Content Scrambling System (CSS), which is a system for protecting copyrights by utilizing encryption with an encryption key, has been developed. The content to be recorded on a DVD is encrypted using three-tier keys (a title key, a disk key, and a master key). DVD players are secretly pre-embedded with a master key available for manufacturers licensed by the CSS Organization. Only such DVD players have a mechanism to decode and reproduce the content (See Non-patent Reference 1).

In addition, for recoding a large volume of content on the DVD, patent technology or the like with which the content is efficiently compression-coded and extension-decoded is adopted.

Therefore, generally, licenses are acquired by manufacturers manufacturing DVD players or the like which reproduce the encrypted content that is recorded on the DVD, and license fees are paid for the respective licenses.

[Non-patent Reference 1] "DVD Content Scrambling System," Natsume Matsuzaki, et al., National Technical Report Volume 43, 3rd Issue, Engineering Administration Center, Matsushita Electric Industrial Co., Ltd, 18 Jun. 1997, pp. 118-122.

DISCLOSURE OF INVENTION

Problems that Invention is to Solve

However, the following problems are present in conventional systems. Note that, in order to identify the problems, the case is assumed here, as shown in FIG. 2, where two licensors A and B exist independently, and it is also assumed that a license A of the licensor A and a license B of the licensor B, both applied to the same product, exist independently from each other. The license of the licensor A is a patent license concerning design information that allows the manufacturing of the product even if not licensed (for example, the above-described extension-decoding technique), whereas the license of the licensor B is a license concerning design information that does not allow the manufacturing of the product if not licensed (for example, secret keys such as the above-described master key).

Under such conditions, there is a possibility that some manufacturers manufacture the product as being licensed from the licensor B, but without being licensed from the licensor A.

In this case, the licensor A can suspend the manufacturing of the product or ask for compensation through enforcement of the patent right, but it is difficult to execute the right due to plant relocation, and so on.

Therefore, there is a demand for a mechanism that does not allow the continuation of product manufacturing unless a patent-license contract is concluded.

Thus, the present invention has an object to provide a design information providing system and a design information providing server equipped with a mechanism that does not allow the continuation of product manufacturing unless a patent license contracts is concluded.

Means to Solve the Problems

Here, the inventor of the present application, considering that design information includes information that is essential for manufacturing products (for example, an encryption key) and information that is not essential (for example, patent information regarding extension-decoding technology), has focused on the design information that is essential for manufacturing products as having power to enforce license-contract conclusion and serving as the source for the contract conclusion. In other words, based on the source for the contract conclusion, the inventor of the present application has arrived at the idea that it is possible to conclude contracts for the licenses of other licensers, using the power to enforce the license-contract conclusion.

Therefore, in order to achieve the above object, the design information providing system according to the present invention is a design information providing system which connects, so as to allow mutual communication: a terminal apparatus used by a first user manufacturing a product; a patent license issuing server used by a second user that concludes, with the first user of the terminal apparatus, a license contract regarding a patent necessary for manufacturing the product; and a design information providing server for providing design information unique to the product, and the patent license issuing server includes: a confirmation information generating unit which generates confirmation information for confirming the conclusion of the license contract; and a confirmation information output unit which outputs, to an outside, the confirmation information generated by the confirmation information generating unit, and the design information providing server includes: a design information issuing unit for issuing the design information to the terminal apparatus that has requested for issuance of the design information; a confirmation information obtaining unit which obtains the confirmation information outputted by the confirmation information output unit; and a control unit which controls the design information issuing unit so that the issuance of the design information to the terminal apparatus is stopped, the terminal apparatus being a terminal apparatus with which the conclusion of the license contract cannot be confirmed by the confirmation information.

With this, the license-contract conclusion is promoted between the licensor that is a user of the patent license issuing server and the user of the terminal apparatus, and thereby it becomes possible to form a mechanism that does not allow the continuation of product manufacturing unless paid for the patent license.

In addition, in the design information providing system according to the present invention, the confirmation information is a contractors list that shows a list of first users having concluded the license contract, and the control unit browses the contractors list only after a lapse of a given length of moratorium, and controls the design information issuing unit, as a result of the browsing, so that the issuance of the design information to the terminal apparatus of a first user that is not on the contractors list is stopped.

With this, it becomes possible to implement the present invention to a system which requires smaller resources of the terminal apparatus, the patent license issuing server, and the encryption key issuing server, and which gives smaller pressures on their performances and costs, and also to establish a system which allows a given length of moratorium for confirming that the terminal apparatus has concluded a license contract with the patent license issuing server.

In addition, in the design information providing system according to the present invention, the confirmation information is a contract certificate issued, to the terminal apparatus having concluded the license contract, for certifying the conclusion of the contract, and the control apparatus confirms, by the contract certificate, the conclusion of the contract, and controls the design information issuing unit, each time a request for issuance of the design information unique to the product is made by the terminal apparatus, so that the issuance of the design information to the terminal apparatus is permitted, the terminal apparatus being a terminal apparatus with which the conclusion of the contract is confirmed.

With this, the license-contract conclusion is promoted between the licensor that is a user of the patent license issuing server and the user of the terminal apparatus, and thereby it becomes possible to quickly form a mechanism that does not allow the continuation of product manufacturing unless paid for the patent license.

In addition, in the design information providing system according to the present invention, a requested quantity of the design information and the contract certificate can be included in the request for issuance of the design information, and the design information providing server may further include a communication unit which communicates with the terminal apparatus, and the control unit may instruct the communication unit to transmit, to the terminal apparatus, a message indicating that the design information cannot be issued, when the contract certificate is not included in the request for issuance of the design information.

In addition, in the design information providing system according to the present invention, the control unit may judge whether or not the contract certificate is valid, when the contract certificate is included in the request for issuance of the design information, and may instruct the communication unit to transmit, to the terminal apparatus, a message indicating that the design information cannot be issued, when the contract certificate is not valid.

In addition, in the design information providing system according to the present invention, the contract certificate may include a validity period for the license, and the control unit may judge whether or not the license is valid, when the contract certificate is valid, and may instruct the communication unit to transmit, to the terminal apparatus, a message indicating that the design information cannot be issued, when the license is not valid.

In addition, in the design information providing system according to the present invention, the control unit may judge, when the license is valid, whether or not the requested quantity included in the request for the design information is within a contracted quantity, and may instruct the communication unit to transmit, to the terminal apparatus, a message indicating that the design information cannot be issued with respect to a portion of the requested quantity, which exceeds the contracted quantity.

In addition, in the design information providing system according to the present invention, the control unit may control the issuing unit so that the design information is issued in the requested quantity in the case where: the contract certificate is included in the request for the design information; the contract certificate is valid; the license is valid; and the requested quantity included in the request for the design information is within the contracted quantity, and may control the communication unit so that the issued design information is transmitted to the terminal apparatus.

With this, design information and the license are linked together, and thereby the design information cannot be provided unless a license contract has been concluded, and the design information cannot be obtained any longer when the license contract expires. In addition, it also becomes possible to recognize the quantity of manufactured products for patent licensing, according to the issuance quantity of design information.

In addition, in the design information providing system according to the present invention, the design information may be an encryption key, and the design information providing server may further include a sticker issuing unit which issues, to the user of the terminal apparatus, a sticker indicating that the product is licensed, and the control unit may control the sticker issuing unit, so that stickers are issued in a quantity according to the quantity of the design information to be issued.

With this, by affixing the sticker to the product, whether or not the license is authorized can be clearly shown, and thereby an unauthorized product using repeatedly an identical encryption key or a non-licensed product can be highlighted for not having the sticker on. As a result, this facilitates the judgment of unauthorized products and non-licensed products, and also facilitates the regulation.

In addition, in the design information providing system according to the present invention, the design information is an encryption key, and the design information providing server further includes a revocation unit which revokes the encryption key to the terminal apparatus with which the conclusion of the license contract cannot be confirmed.

With this, the license-contract conclusion is promoted between the licensor that is a user of the patent license issuing server and the user of the terminal apparatus, and thereby it becomes possible to quickly form a mechanism that does not allow the continuation of product manufacturing unless paid for the patent license.

Note that, the present invention can be implemented, not only as a design information providing system like this, but also as: a design information providing server included in such a design information providing system; a design information providing method which includes, as steps, characteristic units included in the design information providing server; and a program which causes a computer to execute these steps. In addition, it goes without saying that such a program can be distributed through recording media such as CD-ROMs and transmission media such as the Internet.

Effects of the Invention

As is clear from the above description, according to the design information providing system and the design information providing server of the present invention, the conclusion of license contracts is promoted between a licensor that is a user of a patent license issuing server and a user of a terminal apparatus, thereby producing an effect of forming a mechanism that does not allow the continuation of the manufacturing of a product unless paid for the patent license. In addition, design information and the license are linked together, and thereby the design information cannot be provided unless the license contract has been concluded, and the design information cannot be obtained any longer when the license contract expires. In addition, it is also possible to recognize the quantity of manufactured products for patent licensing, according to the issuance quantity of the design information.

Furthermore, by affixing the sticker to the product, whether or not the license is authorized can be clearly shown, and thereby an unauthorized product using, repeatedly, an identical encryption key or a non-licensed product can be highlighted for not having the sticker on. As a result, this facilitates the judgment of unauthorized products and non-licensed products, and also facilitates the regulation.

Therefore, the present invention further promotes the conclusion of license contracts, and the practical value of the present invention is extremely high these days when DVDs and BDs are spreading.

BRIEF DESCRIPTION OF DRAWINGS

FIG. 7 is a flowchart showing the operation of an encryption key issuance process performed by a control unit 35 in the encryption key issuing server 30a.

FIG. 14 is a diagram showing an exemplary structure of a contractors list 100 shown in FIG. 12.

Figure 1:
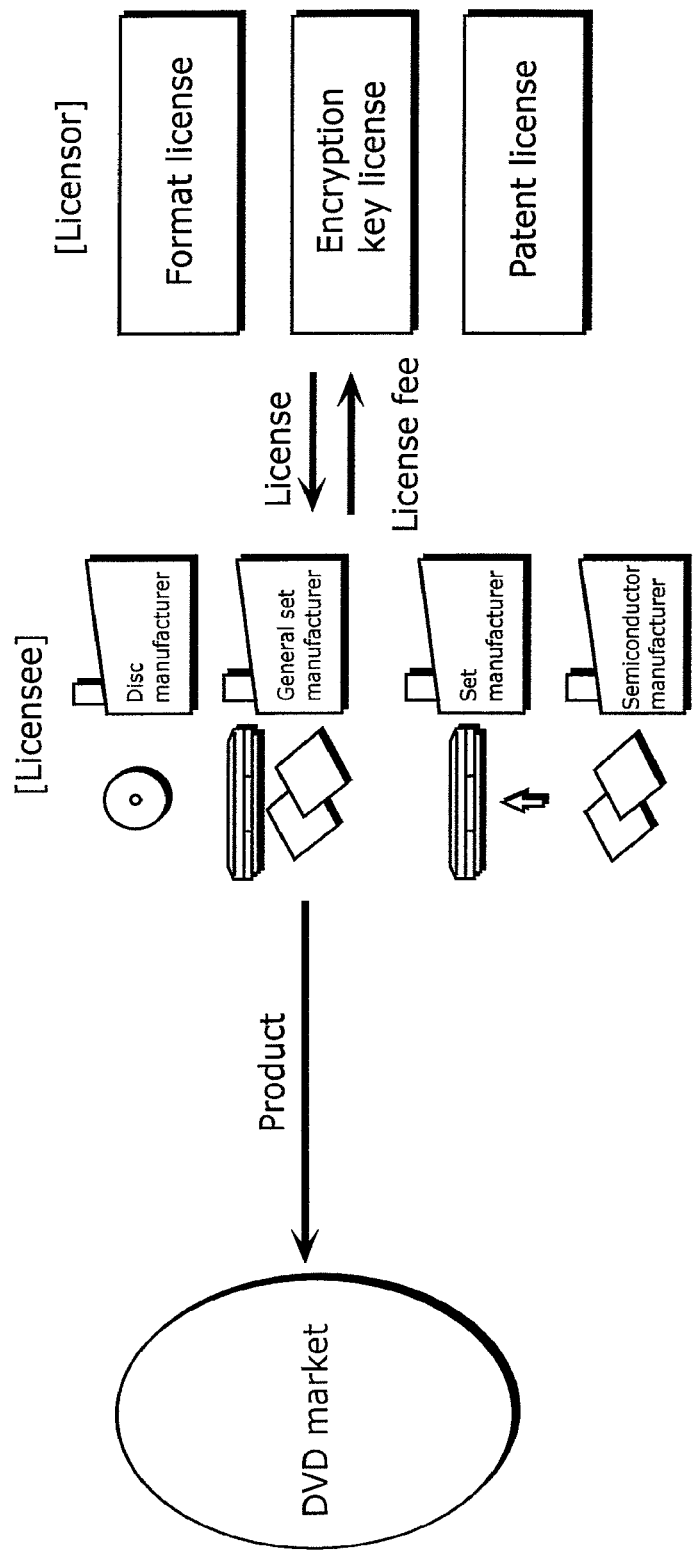
FIG. 1 is a diagram showing a contractual relationship for a license contract that is concluded for an existing DVD-Video.
Figure 2:
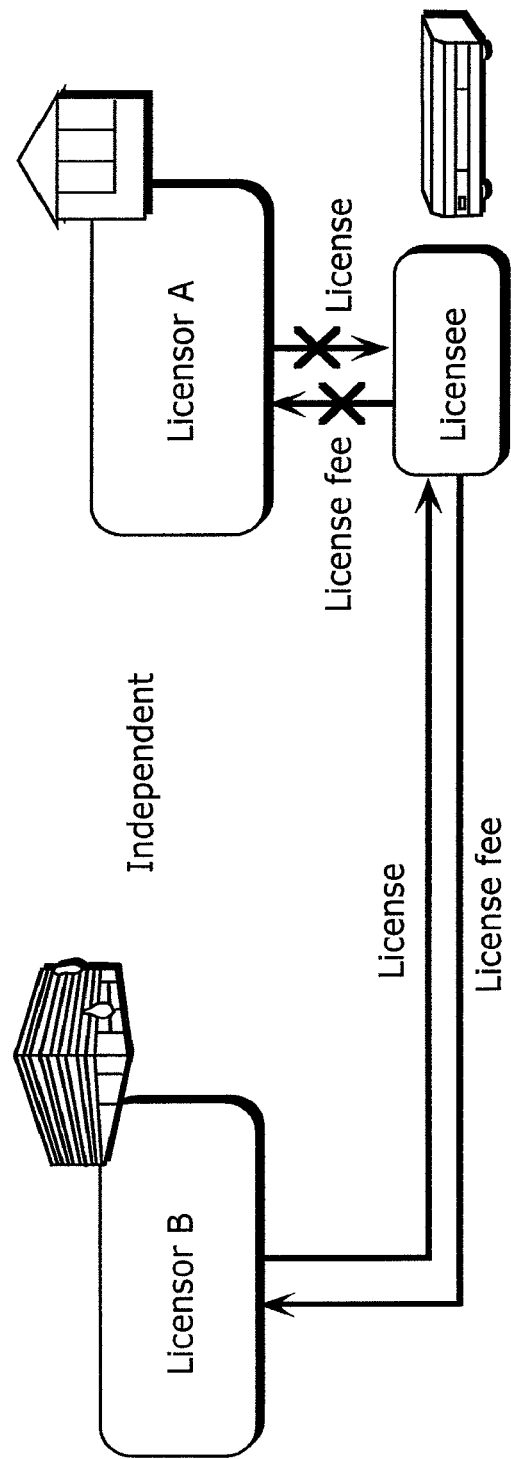
FIG. 2 is a diagram showing a contractual relationship for a license in the case where licensors A and B exist independently.

NUMERICAL REFERENCES 1, 2, 3, 4 Design information providing system
10 Specification server
20a, 20b Patent license issuing server
22 Contract certificate creating unit
26 Contractors list creating unit
30a, 30b, 30c, 30d Encryption key issuing server
31 Own-license management DB
32 Other-company license link management DB
33 Encryption key issuing unit
34 Communication unit
35 Control unit
36 Hologram sticker issuing unit
37 To-be-revoked-key input unit
50 BD player
60 Contract certificate
70 Key issuance request
80 Encryption key
90 Hologram sticker
100 Contractors list

BEST MODE FOR CARRYING OUT THE INVENTION

Hereinafter, embodiments of the present invention shall be described in details with reference to the drawings.

First Embodiment

Figure 3:
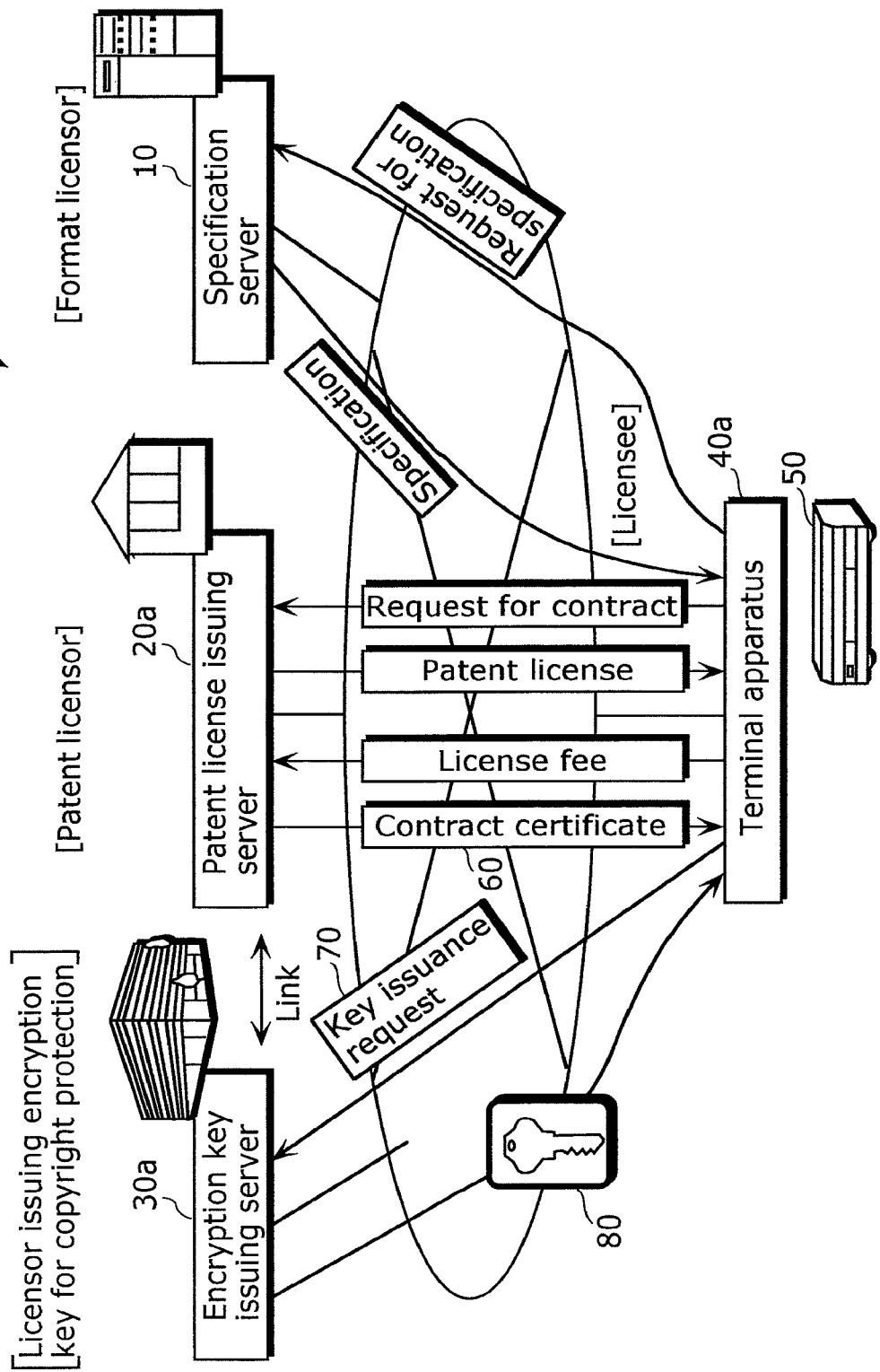
FIG. 3 is a diagram showing the entire structure of a system in a first embodiment.

FIG. 3 is a diagram showing the entire structure of a system in a first embodiment.

A design information providing system 1 is a system providing design information and a license to a user manufacturing a product, while prompting the user to conclude a license contract, such as a patent license.

Note that the description here shall be given based on the following premises.

Premise 1: With both first design information (for example, a specification) and second design information (for example, an encryption key 80) being provided together, the manufacturing of the product (for example, a Blu-ray Disc (BD) player 50) becomes possible.

Premise 2: The second design information (the encryption key 80) is information regarding the severalty of the product manufactured by a licensee. In addition, since the manufacturing of the BD player 50 becomes possible only when the encryption key 80 is provided, it is necessary, and enforceable, to conclude a license contract for the encryption key 80.

Premise 3: The third design information is information regarding the details of the product (for example, content-decoding technique information) obtained from patent publication and so on. Furthermore, in order to manufacture the product using the information legitimately, it is necessary, though not enforceable, to conclude a patent license contract.

As shown in FIG. 3, the design information providing system 1 includes: a specification server 10 that provides a specification as the first design information necessary for manufacturing the BD player 50; a patent license issuing server 20a that issues a patent license regarding a content decoding technique necessary for manufacturing of the BD player 50; an encryption key issuing server 30a that issues an encryption key 80 necessary for manufacturing the BD player 50; a terminal apparatus 40a used by a user (licensee) manufacturing the BD player 50; and a network, such as the Internet, which connects these.

In manufacturing the BD player 50, the terminal apparatus 40a of the licensee requires the specification server 10 for the first design information (specification). When requested for the specification, the specification server 10 provides the specification to the terminal apparatus 40a of the licensee.

The specification includes the IP address of the patent license issuing server 20a that provides the patent license, and the IP address of the encryption key issuing server 30a that provides the encryption key 80.

The terminal apparatus 40a of the licensee transmits, with respect to a first license issuing server (the patent license issuing server 20a), a request for contract conclusion as well as a contracted quantity of units and so on, and pays a license fee equivalent to the contracted quantity of units. When the license fee is paid, the patent license issuing server 20a transmits a contract certificate 60 to the terminal apparatus 40a of the licensee.

The terminal apparatus 40a, having been provided with the contract certificate 60, transmits, to a second license issuing server (the encryption key issuing server 30a), a key issuance request 70 including the contract certificate 60 as well as the quantity of the second design information (encryption keys) that is required, and requests for the encryption key 80. Note that, a request for contract conclusion as well as the contracted quantity of units may also be transmitted, along with the key issuance request 70, to the encryption key issuing server 30a; however, the description shall be given here, assuming, as is the case with the patent license issuing server 20a, that the request for contract conclusion as well as the contracted quantity of units are transmitted in advance to the encryption key issuing server 30a and that the license fee equivalent to the contracted quantity has been paid.

When the key issuance request 70 is performed, the second license issuing server recognizes authenticity of the contract certificate included in the key issuance request 70, and provides, to the licensee, design information regarding the encryption keys 80 in the quantity requested in the key issuance request 70.

Next, the structure of each apparatus included in the design information providing system 1 shall be described. Note that the detailed description of the structure of the specification server 10 is omitted since, in this design information providing system 1, the specification server 10 merely provides specifications.

Figure 4:
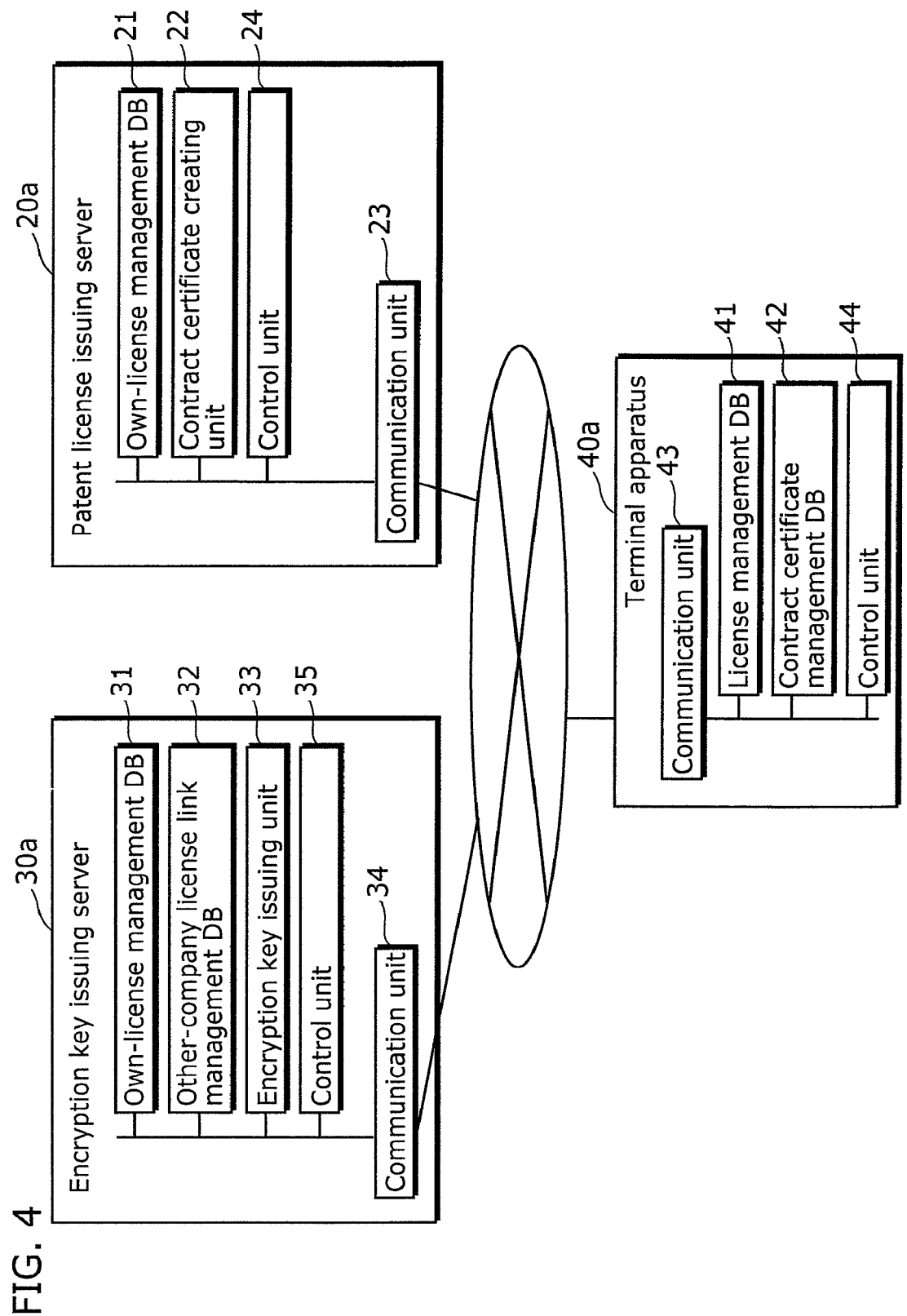
FIG. 4 is a block diagram showing the detailed structures of a patent license issuing server 20a, an encryption key issuing server 30a, and a terminal apparatus 40a, which are shown in FIG. 3.

FIG. 4 is a block diagram showing the detailed structures of the patent license issuing server 20a, the encryption key issuing server 30a, and the terminal apparatus 40a, which are shown in FIG. 3.

The patent license issuing server 20a includes: an own-license management DB 21, a contract certificate creating unit 22, a communication unit 23, and a control unit 24.

The own-license management DB 21 manages licenses regarding the patents owned by the company. The details managed in the own-license management DB 21 include: a licensee name (license ID), a contract period, a contracted quantity, a license fee, and so on.

The contract certificate creating unit 22 includes a signature of the patent license issuing server and generates the contract certificate 60 for certifying the license contract. An exemplary format structure of the contract certificate 60 is shown in FIG. 5.

Figure 5:
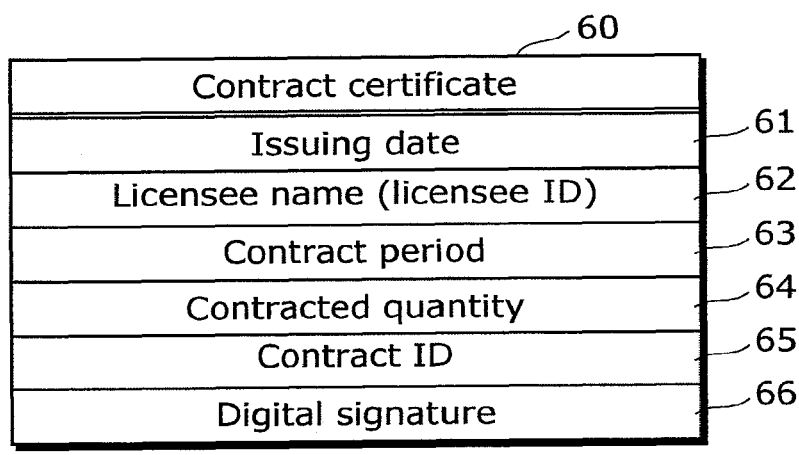
FIG. 5 is a diagram showing an exemplary format structure of a contract certificate 60 shown in FIG. 3.

The contract certificate 60, as shown in FIG. 5, includes: an issuing date 61 for the contract certificate 60; a licensee name (licensee ID) 62 of the licensee having concluded the contract; a contract period 63; a contracted quantity 64, and a contract ID 65 for identifying the contract certificate 60; and a digital signature 66, performed by the patent license issuing server 20a, onto the above constituent elements from the issuing date 61 to the contract ID 65.

The communication unit 23 communicates with the terminal apparatus 40a and so on through the network.

The control unit 24 controls, in an integrated manner, constituent elements from the own-license management DB 21 to the communication unit 23. Specifically, when, from the terminal apparatus 40a, a request for contract conclusion as well as the contracted quantity of units and so on are transmitted, or a license fee equivalent to the contracted quantity of units is paid, the control unit 24 causes the patent license to be managed in the own-license database DB 21, and causes the contract certificate creating unit 22 to create the contract certificate 60 for the patent license, and transmits the created contract certificate 60 to the terminal apparatus 40a through the communication unit 23.

The terminal apparatus 40a includes: a license management DB 41, a contract certificate management DB 42, a communication unit 43, and a control unit 44.

The license management DB 41 manages: a specification obtained from the specification server 10; a patent license and patent information thereof, which are obtained from the patent license issuing server 20a; and the license and the encryption key 80 thereof, which are obtained from the encryption key issuing server 30a.

The contract certificate management DB 42 manages the contract certificate 60 obtained from the patent license issuing server 20a.

The communication unit 43 communicates, through the network, with the specification server 10, the patent license issuing server 20a, the encryption key issuing server 30a, and so on.

The control unit 44 controls, in an integrated manner, constituent elements from the license management DB 41 to the communication unit 43. Specifically, the control unit 44, through the communication unit 43: requests the specification server 10 for a specification; receives the specification from the specification server 10; requests the patent license issuing server 20a for conclusion of the contract; receives the patent license and the contract certificate 60 from the patent license issuing server 20a; generates a key issuance request 70 including the requested quantity of encryption keys and the contract certificate, and transmits, to the encryption key issuing server 30a, the generated key issuance request 70; and receives the required quantity of encryption keys 80 from the encryption key issuing server 30a. An exemplary format structure of the key issuance request 70 is shown in FIG. 6.

Figure 6:
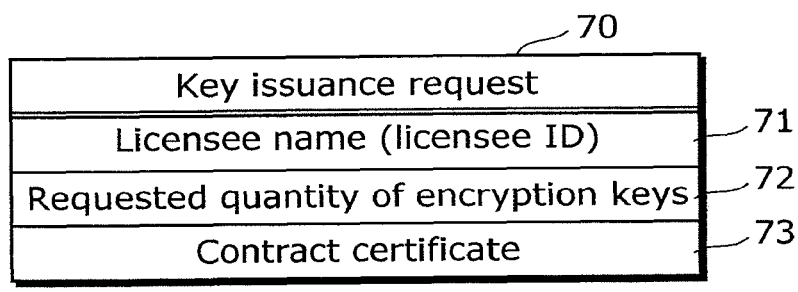
FIG. 6 is a diagram showing an exemplary format structure of a key issuance request 70 shown in FIG. 3.

The key issuance request 70, as shown in FIG. 6, includes: a licensee name (licensee ID) 71 of the licensee having concluded the contract; a requested quantity of encryption keys 72; and a contract certificate 73 for certifying the contract with the patent license issuing server 20a.

The encryption key issuing server 30a includes: an own-license management DB 31, an other-company license link management DB 32, an encryption key issuing unit 33, a communication unit 34, and a control unit 35.

The own-license management DB 31 manages the licenses owned by the company. The details managed in the own-license management DB 21 includes: a licensee name (licensee ID), a contract period, a contracted quantity, a license fee, and so on, as is the case with the details managed in the own-license management DB 21 in the patent license issuing server 20a.

The other-company license link management DB 32 manages the quantity of encryption keys 80 having been issued, the contracted quantity included in the contract certificate 60, and so on, so as to link the encryption key 80 with the patent license of another company.

The encryption key issuing unit 33 issues an encryption key 80 that is unique to each BD player 50.

The communication unit 34 communicates with the terminal apparatus 40a and so on through the network.

The control unit 35 controls, in an integrated manner, constituent elements from the own-license management DB 31 to the communication unit 34. Specifically, the control unit 35, when, from the terminal apparatus 40a, a request for contract conclusion, the contracted quantity of units, and so on are transmitted, or a license fee equivalent to the contracted quantity of units is paid, causes the patent license for issuing the encryption key 80 to be managed in the own-license DB 31. In addition, when the key issuance request 70 including the requested quantity of encryption keys 80 and the contract certificate 60 is performed, the control unit 35 causes a valid contract certificate 60 to be managed in the other-company license link management DB 32 or performs the encryption key issuance process.

Figure 7:
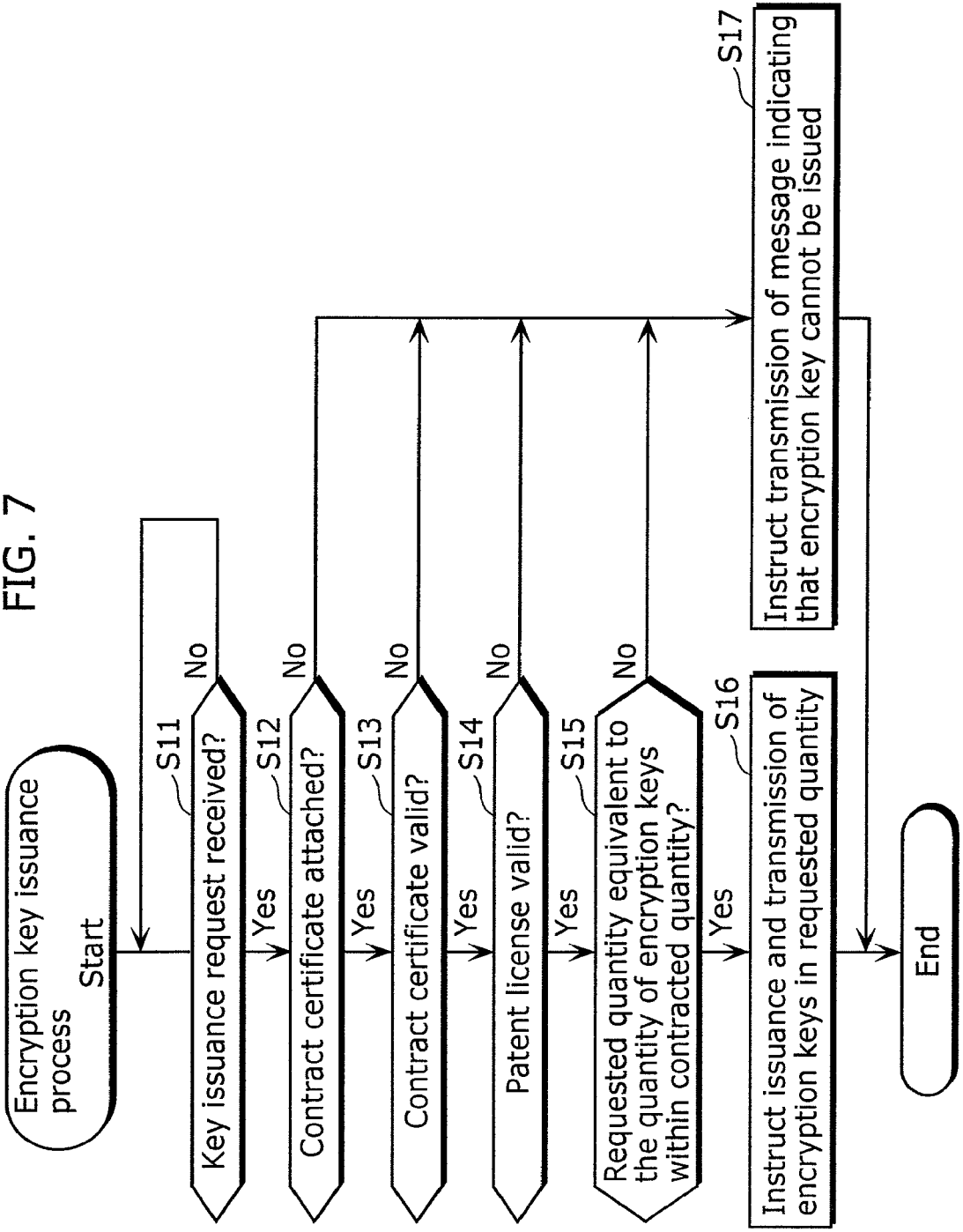

FIG. 7 is a flowchart showing the operation of the encryption key issuance process performed by the control unit 35 in the encryption key issuing server 30a.

The control unit 35 waits to receive the key issuance request via the communication unit 34 (S11). When the key issuance request is received (Yes in S11), the control unit 35 judges whether or not the contract certificate is attached (S12). When the contract certificate is not attached (No in S12), the control unit 35 instructs the communication unit 34 to transmit a message indicating that the encryption key cannot be issued (S17). Note that in place of the message, or together with the message, a message indicating that a license contract should be concluded with the patent licensor may be transmitted.

When the contract certificate is attached (Yes in S12), the control unit 35 judges whether or not the contract certificate is valid (S13). The judgment is performed based on whether or not the digital signature is authentic.

When the contract certificate is not valid (No in S13), the control unit 35 instructs the communication unit 34 to transmit the message indicating that the encryption key cannot be issued (S17).

When the contract certificate is valid (Yes in S13), the control unit 35 judges whether or not the patent license is valid (S14). The judgment is performed based on whether or not the patent license is within the contract period. However, it goes without saying that the judgment is also performed based on whether the license of the encryption key is within the contract period. Note that, in the case where the contract certificate does not include any item regarding the period an so on, the judgment in Step S14 can be omitted.

When the patent license is not valid (No in S14), the control unit 35 instructs the communication unit 34 to transmit the message indicating that the encryption key cannot be issued (S17).

When the patent license is valid (Yes in S14), the control unit 35 judges whether or not the requested quantity is equivalent to the quantity of the encryption keys within the contracted quantity (S15). Specifically, the judgment is performed by comparing the sum of the quantity of encryption keys requested this time and the quantity of encryption keys having been issued so far, with the contracted quantity regarding the patent license. However, it goes without saying that the judgment is performed by comparing the sum of the quantity of encryption keys requested this time and the quantity of encryption keys having been issued so far, with the contracted quantity regarding the license for the encryption key.

When the requested quantity is not equivalent to the quantity of encryption keys within the contracted quantity (No in S15), the control unit 35 instructs the communication unit 34 to transmit the message indicating that the encryption key cannot be issued (S17). Note that in the case where the requested quantity is not satisfied, though there is a remaining quantity for the contracted quantity, the communication unit 34 may be instructed to transmit, to the terminal apparatus, a message indicating that the design information cannot be issued with respect to a portion of the requested quantity which exceeds the contracted quantity, while the remaining quantity of encryption keys is issued.

When the requested quantity is equivalent to the quantity of encryption keys within the contracted quantity (Yes in S15), the control unit 35 instructs the encryption key issuing unit 33 to issue the requested quantity of encryption keys, and instructs the communication unit 34 to transmit the issued encryption keys (S16).

In other words, in the case of No in one of the steps S12 to S15, the message indicating that the encryption key cannot be issued is transmitted. Therefore, since it is necessary to obtain the encryption key 80 in order to manufacture the BD player 50, the encryption key 80 serves as the "source of power to enforce license-contract conclusion" and the submission of a valid contract certificate 60 is required. Then, with such power to enforce license-contract conclusion of the encryption key 80, it becomes possible to promote the conclusion of a license contract even for a patent license that does not have the power to enforce the conclusion of the license contract, so that the license-contract conclusion with the patent licensor is ensured.

In addition, in the case of Yes in steps S12 to S15, that is to say, on condition of the confirmation of the contract certificate 60, the encryption key and the patent license are linked. Accordingly, the "encryption key" cannot be provided unless the license contract has been concluded, and the "encryption key" cannot be obtained any longer when the patent license contract expires. In addition, it is also possible to recognize the quantity of manufactured units for patent licensing, according to the issuance quantity of encryption keys.

Second Embodiment

Next, a system according to a second embodiment shall be described.

Figure 8:
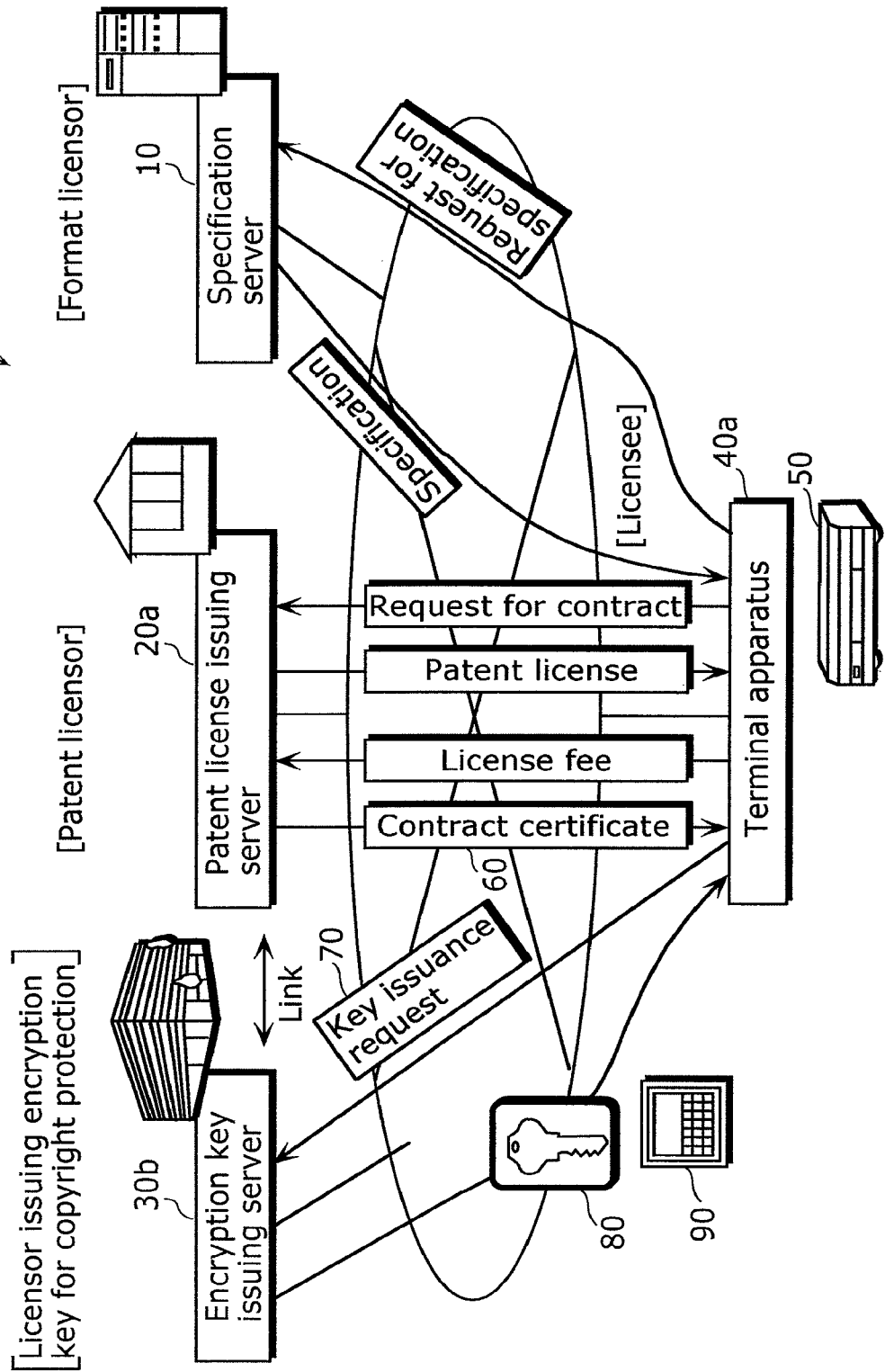
FIG. 8 is a diagram showing the entire structure of a system in a second embodiment.

FIG. 8 is a diagram showing the entire structure of the system in the second embodiment. Note that the constituent elements corresponding to those of the structure of the design information providing system 1 in the first embodiment are given with the same numerical references, and their descriptions shall be omitted.

Meanwhile, there is a possibility that the encryption key 80, which is the "second design information" for "giving severalty to each apparatus," is used for plural apparatuses after the encryption key 80 is obtained through a due contract for only a part of the units. In such a case, it is very difficult to detect the fraud. Therefore, a design information providing system 2 according to the second embodiment includes, in place of an encryption key issuing server 30a, an encryption key issuing server 30b having a function to issue, to a terminal apparatus 40a, a hologram sticker 90 in a quantity according to the quantity of encryption keys 80. The hologram sticker 90 having been issued to the terminal apparatus 40a is affixed to a manufactured BD player 50 at a point where the sticker looks noticeable, for certifying that the license is authorized. Note that it is preferable that the quantity of hologram stickers 90 according to the quantity of encryption keys 80 should be equal to the quantity of encryption keys. In addition, in consideration of improper affixing and so on, the issuance may be increased by a given degree; in this case, the correspondence relationship between the encryption keys and the hologram stickers 90 may be maintained by, for example, requiring a report on the incremental amount used and requiring the return of improperly-affixed stickers.

Figure 9:
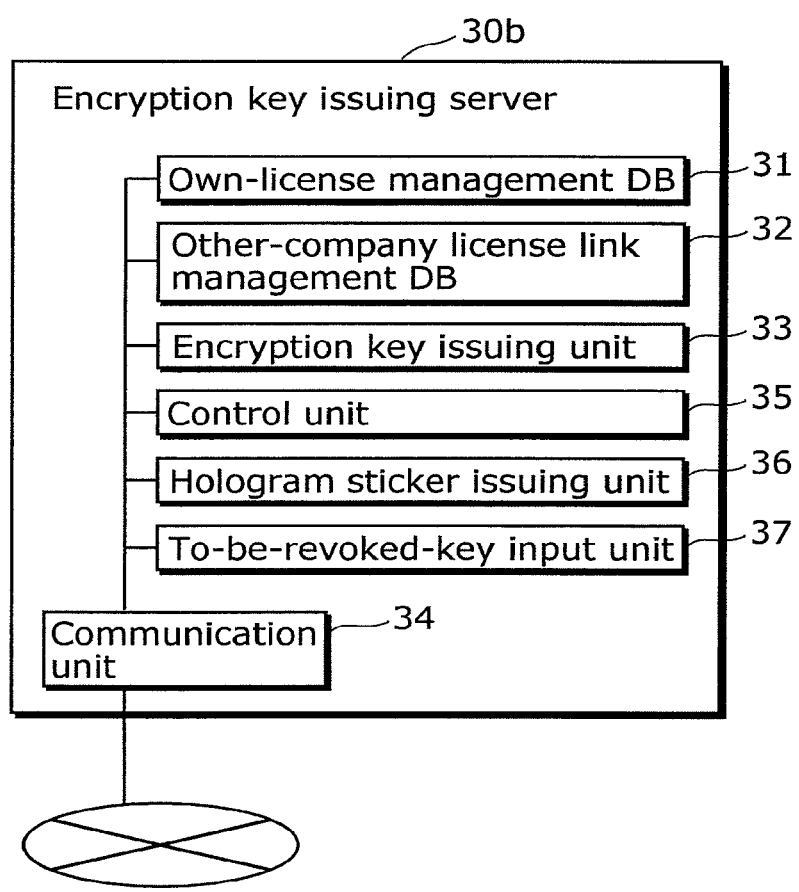
FIG. 9 is a block diagram showing the structure of an encryption key issuing server 30b shown in FIG. 8.

FIG. 9 is a block diagram showing the structure of the encryption key issuing server 30b.

As shown in FIG. 9, the encryption key issuing server 30b further includes a hologram sticker issuing unit 36 and a to-be-revoked-key input unit 37, in addition to the constituent elements from the own-license management DB 31 to the control unit 35 included in the encryption key issuing server 30a.

The hologram sticker issuing unit 36 issues hologram stickers 90 in a quantity equal to the quantity of encryption keys 80 issued by the encryption key issuing unit 33.

The to-be-revoked-key input unit 37 accepts an input of information regarding the encryption keys, directed by a user, to be revoked. The information regarding the encryption keys to be revoked is transmitted, based on the instruction of the control unit 35, to a CA that issues an open key certificate, and shown in an open key certificate revocation list (CRL) or notified to a manufacturer or the like that encrypts and records the content on BDs.

Figure 10:
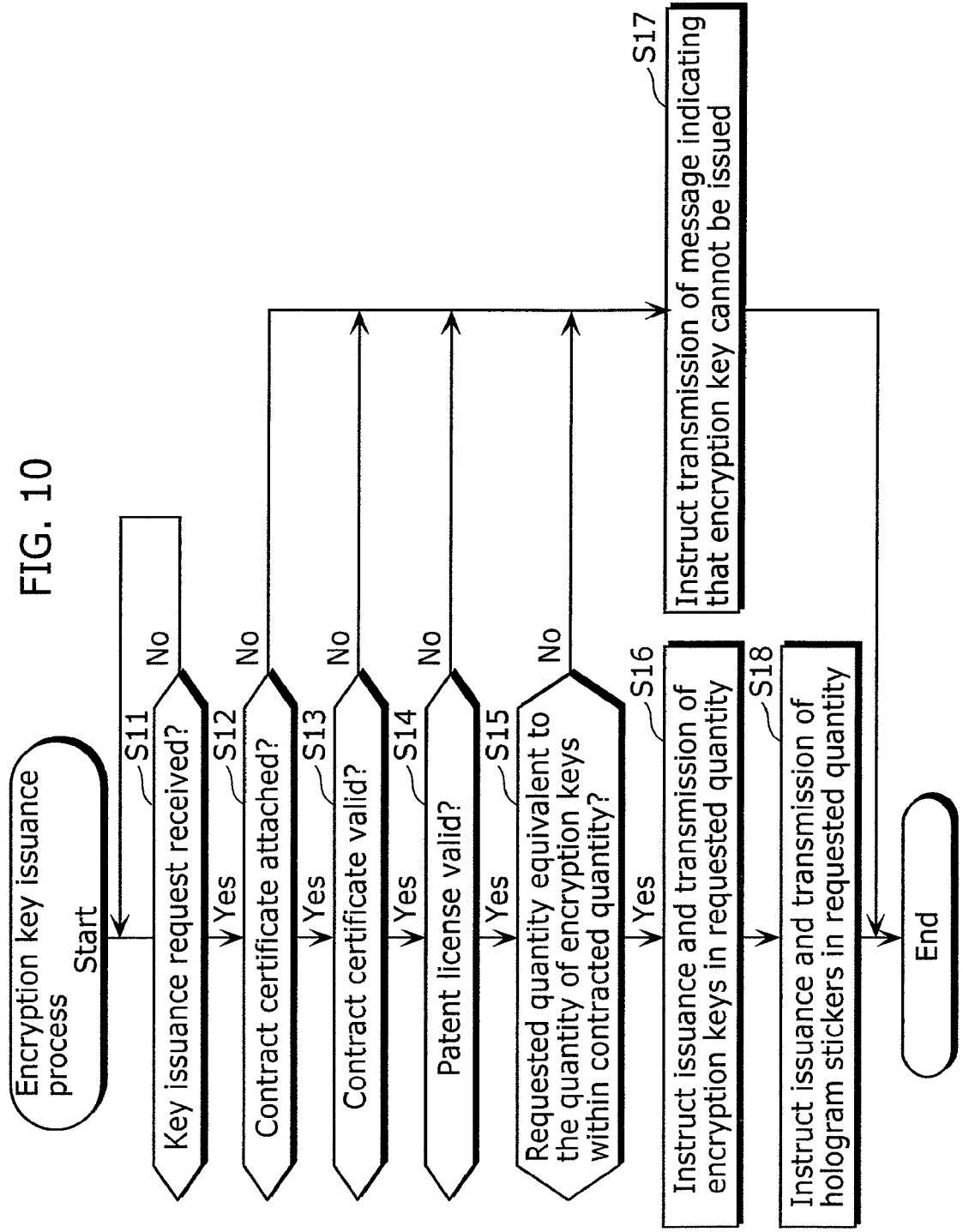
FIG. 10 is a flowchart showing the operation of an encryption key issuance process performed by the control unit 35 in the encryption key issuing server 30b.

FIG. 10 is a flowchart showing the operation of the encryption key issuance process performed by the control unit 35 in the encryption key issuing server 30b. Note that the same step number is assigned to each part corresponding to the encryption key issuance process in FIG. 7, and the description thereof is omitted.

After the control unit 35 instructs the encryption key issuing unit 33 to issue the requested quantity of encryption keys and instructs the communication unit 34 to transmit the issued encryption key (S16), the control unit 35 instructs the hologram sticker issuing unit 36 to issue the requested quantity of hologram stickers, and instructs the hologram stickers 90, having been issued to a user and so on, to be transmitted (S18). In other words, the hologram stickers 90 in a quantity equal to the quantity of encryption keys 80 are sent to a licensee at the terminal apparatus 40a.

Here, the hologram sticker 90 has a specific mark which stands out when exposed to the light, and therefore cannot be forged.

Thus, by affixing the hologram sticker 90 to the product, whether or not the license is authorized can be clearly shown, and thereby an unauthorized product using repeatedly an identical encryption key or a non-licensed product can be highlighted for not having the hologram sticker 90 on. This facilitates the judgment of unauthorized products and non-licensed products, and also facilitates the regulation.

Further, in order to ensure that the duplicated use of an encryption key is not permitted, since respective apparatuses are assigned with different encryption keys 80 and also for the purpose of recognizing the contracted quantity of units, the encryption key is revoked, when a BD that is not affixed with a hologram sticker 90 is found, by analyzing the encryption key 80 for the BD player and inputting, through the to-be-revoked-key input unit 37, information regarding the encryption key 80.

Here, when authentication is performed and in the case where the encryption key is used for the authentication, an exchange of certificates takes place for public-key encryption in advance of the authentication (Challenge-Response authentication).

At this time, the authenticating side records, on the certificate revocation list (CRL), the certificate ID corresponding to the encryption key to be revoked, so as to make the encryption key unusable.

Figure 11:
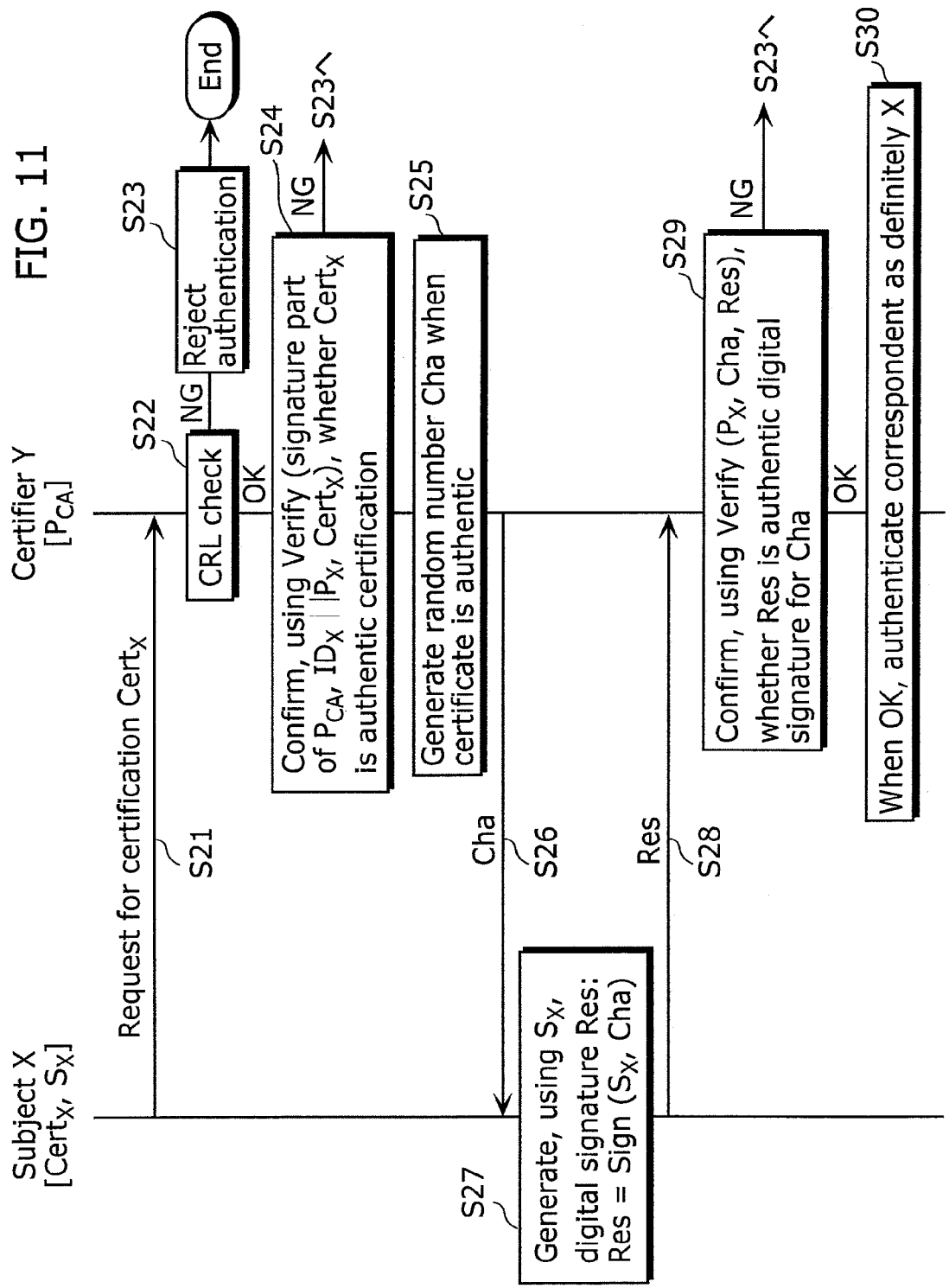
FIG. 11 is a diagram showing an example of a Challenge-Response authorization using a public-key encryption.

FIG. 11 is a diagram showing an example of the Challenge-Response authorization using public-key encryption. Note that, in the figure, respectively: $S_{CA}$ shows a secret key of the certificate authority CA; $P_{CA}$ shows a public key to $S_{CA}$; $S_x$ shows a secret key of a subject X; $P_x$ shows a key corresponding to $S_x$; $Cert_x$ shows a public-key certificate corresponding to $P_x$; Sign shows a digital signature algorithm; Verify shows a validation algorithm for Sign; and $Cert_x$ shows $ID_x \| P_x \|$ (a digital signature of CA to "$ID_x \| P_x$"). Note that the format of $Cert_x$ is not limited to this example, and other formats are also applicable.

The subject X forwards an authentication request and a $Cert_x$ to a certifier Y (S21).

The certifier Y checks whether or not the $Cert_x$ is on the CRL (S22).

When the $Cert_x$ is on the list (NG in S22), the certifier Y rejects authentication (S23). When the $Cert_x$ is not on the list, the certifier Y confirms, using Verify (the signature part of $P_{CA}$, $ID_x \| P_x$, $Cert_x$), whether the $Cert_x$ is an authentic certification (S24). When the result of the confirmation is NG, the step S23 is executed.

When the certificate is authentic, the certifier Y generates a random number Cha (S25), and transmits the Cha to the subject X (S26).

The subject X generates, using $S_x$, a digital signature Res with respect to the Cha (S27). Here, Res=Sign ($S_x$, Cha). Subsequently, the subject X transmits the Res to the certifier Y (S28).

The certifier Y confirms, using Verify ($P_X$, Cha, Res), whether the Res is an authentic digital signature with respect to the Cha (S29). When the result of the confirmation is NG, the step S23 is executed. When the result of the confirmation is OK, the correspondent is authenticated as definitely X (S30).

With such a process being performed, it is possible to reject the duplicated use of an encryption key.

In addition, when authentication is performed and in the case where common key encryption is used, the authenticating side holds the same common-key data; therefore, the authenticating side may reject authentication by recognizing the revocation (that the above-described list is present).

Furthermore, when encryption-key block is used, which is a technique to revoke part of the keys without using the CRL, such as an MKB technique (Japanese Unexamined Patent Application Publication No. 2000-31922) and an RKB technique (Japanese Unexamined Patent Application Publication No. 2002-281013), it becomes possible to make an apparatus holding the revoked encryption key unable to obtain a content key, by "efficiently encrypting" and transmitting the content key, based on a device key (corresponding to the encryption key 80) as a common key to be provided to the apparatus and used for authentication.

Therefore, with such a process being performed, it is also possible to reject the duplicated use of an encryption key.

Note that the process in the second embodiment is performed using the hologram sticker 90, but other stickers, such as a stick-on IC tag to be stuck on an apparatus, which holds data including watermark, may also be used for detecting whether or not the certificate for the license authorization is present.

Third Embodiment

Next, a system according to a third embodiment shall be described.

Figure 12:
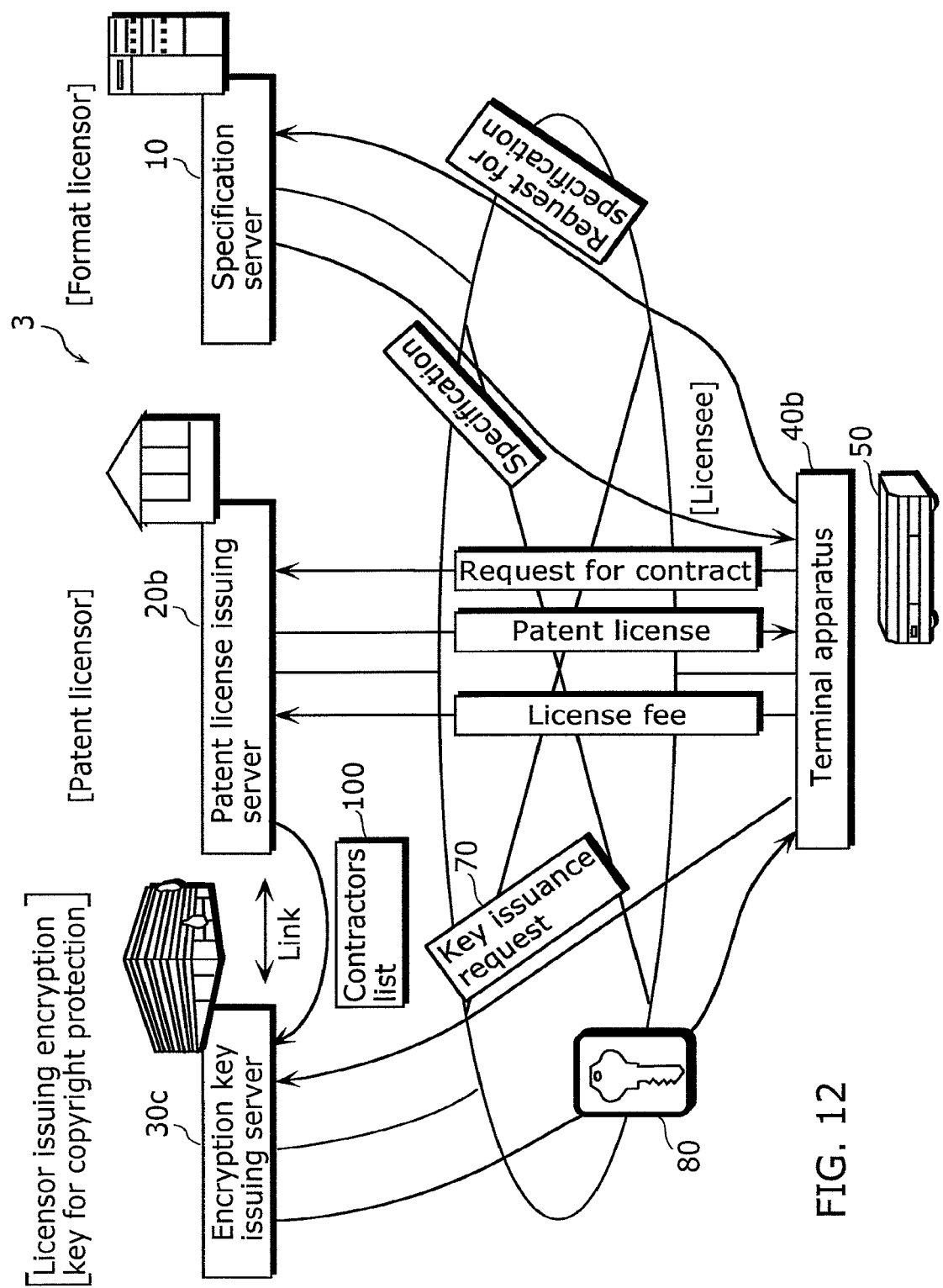
FIG. 12 is a diagram showing the entire structure of a system in a third embodiment.

FIG. 12 is a diagram showing the entire structure of the system in the third embodiment. Note that the constituent elements corresponding to those of the structures of the design information providing systems 1 and 2 in the first and the second embodiments are given with the same numerical references, and their descriptions shall be omitted.

Meanwhile, in the design information providing systems 1 and 2, it is confirmed, by the contract certificate 60, that the terminal apparatus 40*a* has concluded a license contract with the patent license issuing server 20*a*. However, when attempting to confirm, by the contract certificate 60, that the license contract has been concluded, greater resources are required of the terminal apparatus 40*a*, the patent license issuing server 20*a*, and the encryption key issuing servers 30*a* and 30*b*, so that pressures on their performances and costs become greater. For this reason, a design information providing system, which requires smaller resources of the terminal apparatus, the patent license issuing server, and the encryption key issuing server, and which gives smaller pressures on their performances and costs, is expected to be provided.

In addition, in the design information providing systems 1 and 2, it is confirmed that the user of the terminal apparatus 40*a* has concluded a license contract with the patent license issuing server 20*a*, when the terminal apparatus 40*a* transmits a key issuance request 70 to the encryption key issuing server 30*a*. However, a certain length of period is required for designing a player 50, and it is usually the case that the license contract is not concluded until completion of the designing. For this reason, a design information providing system which allows a given length of moratorium for confirming that the terminal apparatus has concluded the license contract with the patent license issuing server is also expected to be provided.

Thus, in the design information providing system 3, the patent license issuing server 20*b* creates, in place of the contract certificate 60, a contractors list 100 that shows a list of users of the terminal apparatuses with which the license contract has been concluded, and distributes the created contractors list 100 to an encryption key issuing server 30*c*. Then, the encryption key issuing server 30*c* issues an encryption key 80, until a given length of moratorium elapses, without confirming the contractors list 100, and confirms, after a lapse of the given length of moratorium, whether or not the user of the terminal apparatus 40*a* has concluded the license contract with the patent license issuing server 20*a*, and stops issuing the encryption key 80 unless the contract has not been concluded.

Figure 13:
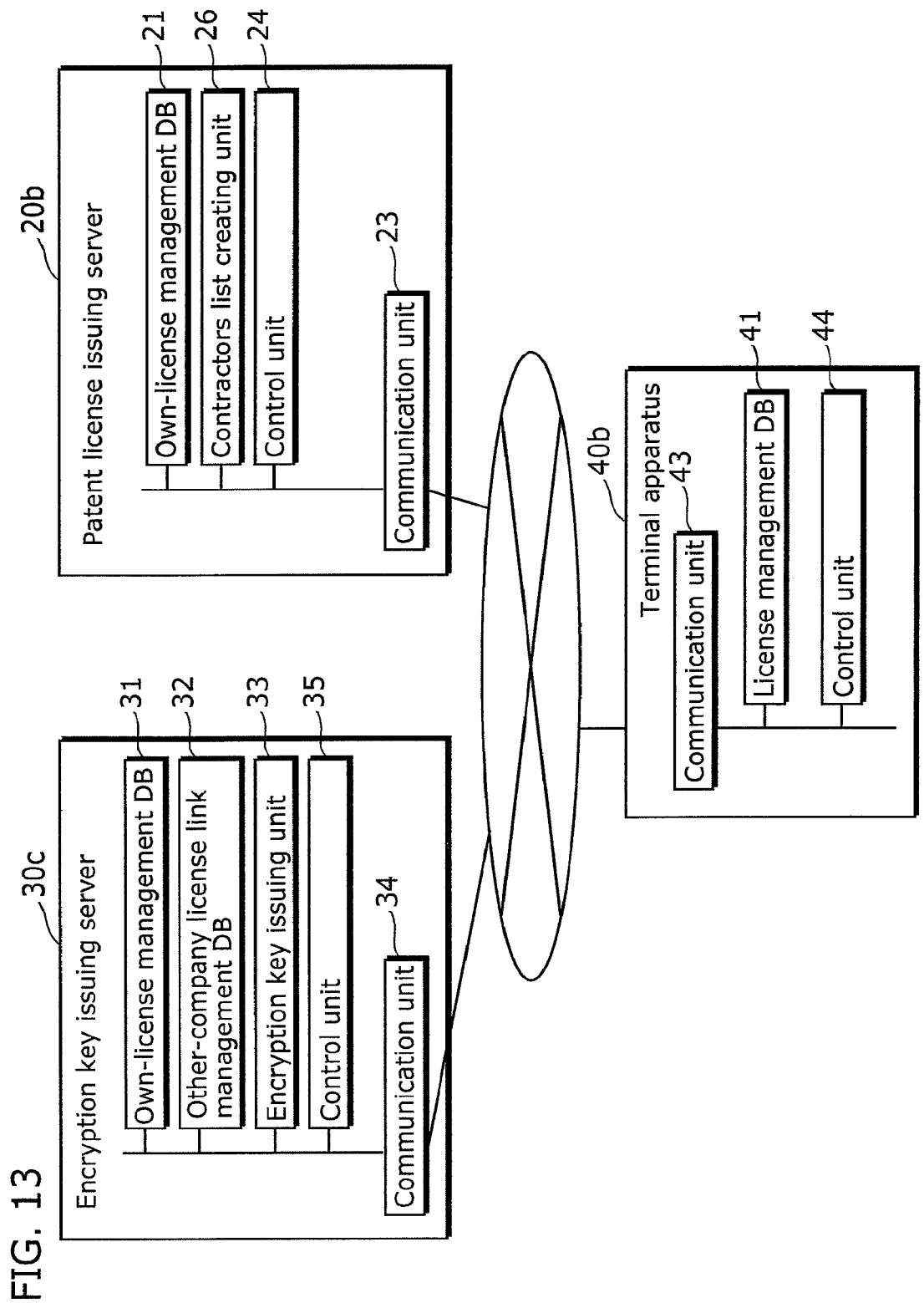
FIG. 13 is a block diagram showing the detailed structures of a patent license issuing server 20b, an encryption key issuing server 30c, and a terminal apparatus 40b, which are shown in FIG. 12.

FIG. 13 is a block diagram showing the detailed structures of the patent license issuing server 20*b*, the encryption key issuing server 30*c*, and the terminal apparatus 40*b*, which are shown in FIG. 12. Note that the constituent elements corresponding to those of the structures of the patent license issuing server 20*a*, the encryption key issuing server 30*a*, and the terminal apparatus 40*a* that are shown in FIG. 4 are given with the same numerical references, and their descriptions shall be omitted.

As shown in FIG. 13, the patent license issuing server 20*b* includes, in place of the contract certificate creating unit 22, a contractors list creating unit 26 which creates the contractors list 100. The contractors list 100, as shown in FIG. 14, includes; a licensor name 101 for identifying the licensor; a target patent 102 that is to be licensed; a licensee name 103 for identifying the name of the licensee that has concluded the license contract, and so on. The contractors list 100 is generated each time, regarding the target patent 102, the license contract is concluded with a new manufacturer or the license expires, that is, the details of the licensee name 103 change. Note that the contractors list 100 may include: a license period, quantity, region, and license details showing an embodiment of the patent invention (such as an IC chip).

The terminal apparatus 40*b* has the structure of the terminal apparatus 40*a*, with the contract certificate management DB 42 being excluded.

The other-company license link management DB32 in the encryption key issuing server 30*c* manages, by storing, for example, the contractors list 100 distributed from the patent license issuing server 20*b*. The own-license management DB31 manages a series of key issuance requests 70, an issuing date for the key issued by an encryption key issuing unit 33, the quantity of issuance, and so on. The control unit 35 issues the encryption key 80, until a given length of moratorium elapses, without confirming the contractors list 100, but confirms, after a lapse of the given length of moratorium, whether or not the user of the terminal apparatus 40*a* has concluded a license contract with the patent license issuing server 20*a*, with reference to the contractors list 100 managed in the other-company license link management DB32.

Figure 15:
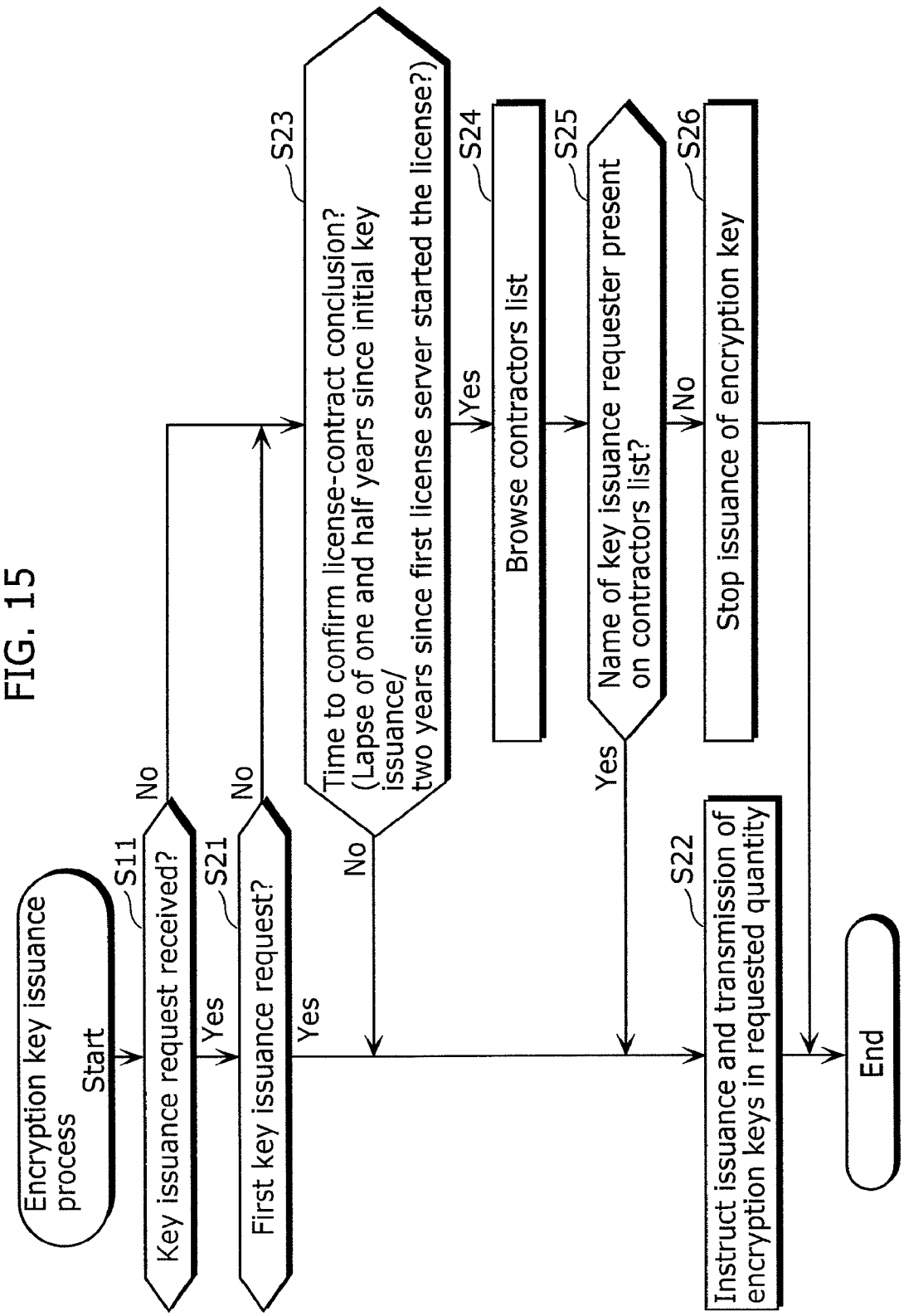
FIG. 15 is a flowchart showing the operation of the encryption key issuance process performed by the control unit 35 in the encryption key issuing server 30c.

FIG. 15 is a flowchart showing the operation of the encryption key issuance process performed by the control unit 35 in the encryption key issuing server 30*c*.

The control unit 35 judges whether or not the key issuance request is received through the communication unit 34 (S11). When the key issuance request is received (Yes in S11), the control unit 35 judges whether or not the key issuance request 70 is the first key issuance request (S21). In the case of the first key issuance request (Yes in S21), the control unit 35 instructs the encryption key issuing unit 33 to issue a requested quantity of encryption keys, and instructs the communication unit 34 to transmit the issued encryption keys (S22).

In the case where the key issuance request is not received (No in S11), or in the case of the issuance request that is not the first (No in S21), that is, on an irregular basis, the control unit 35 judges whether or not it is time to confirm the conclusion of a license contract (S23). The timing of confirmation of the license-contract conclusion can be, for example, a date after a lapse of one and half years since the first key issuance, or a date after a lapse of two years since the first license server (the patent license issuing server 20*b*) started the license, since the date as these is sufficient for a moratorium necessary for the user of the terminal apparatus 40*b* to complete the designing of the player 50.

When it is time to confirm the license-contract conclusion, the control unit 35 browses the contractors list 100 managed by the other-company license link management DB32 and judges whether or not the user name for the terminal apparatus 40*b* is present among the licensee names 103 in the contractors list 100. When the user name is not present (No in S25), the control unit 35 stops the issuance of the encryption key (S26). Note that for stopping the issuance of the encryption key, the control unit 35 may instruct the communication unit 34 to transmit a message indicating that the encryption key cannot be issued, or may also transmit, in place of this message or together with the message, a message indicating that the license contract should be concluded with the patent licensor.

In the case where it is not yet time to confirm the license-contract conclusion (No in S23), or after the coming of the time to conclude the license contract, when the user name for the terminal apparatus 40*b* is present in the contractors list 100 (Yes in S25), the control unit 35 instructs the encryption key issuing unit 33 to issue a requested quantity of encryption keys, and instructs the communication unit 34 to transmit the issued encryption keys (S22).

In other words, in the case of No in one of the steps S11 and S21, and Yes in Step S23 and No in Step S25, the issuance of the encryption key is stopped. Therefore, since it is necessary to acquire the encryption key 80 in order to manufacture the BD player 50, the encryption key 80 serves as the "source of power to enforce license-contract conclusion," and the conclusion of a license contract is required. Then, with such power to enforce license-contract conclusion of the encryption key 80, it becomes possible to promote the conclusion of a license contract even for a patent license that does not have the power to enforce the conclusion of the license contract, so that the license-contract conclusion with the patent licensor is ensured.

In addition, after a lapse of the given length of moratorium, as a condition for confirming the contract by the contractors list 100, the encryption key and the patent license are linked. Accordingly, the "encryption key" cannot be provided unless the license contract has been concluded, and the "encryption key" cannot be obtained any longer when the patent license contract expires Therefore, it becomes possible to establish a system which requires smaller resources of the terminal apparatus, the patent license issuing server, and the encryption key issuing server, which is also applicable to a system giving smaller pressures on costs and performance, and which has a moratorium for confirming that the terminal apparatus has concluded a license contract with the patent license issuing server.

Fourth Embodiment

Figure 16:
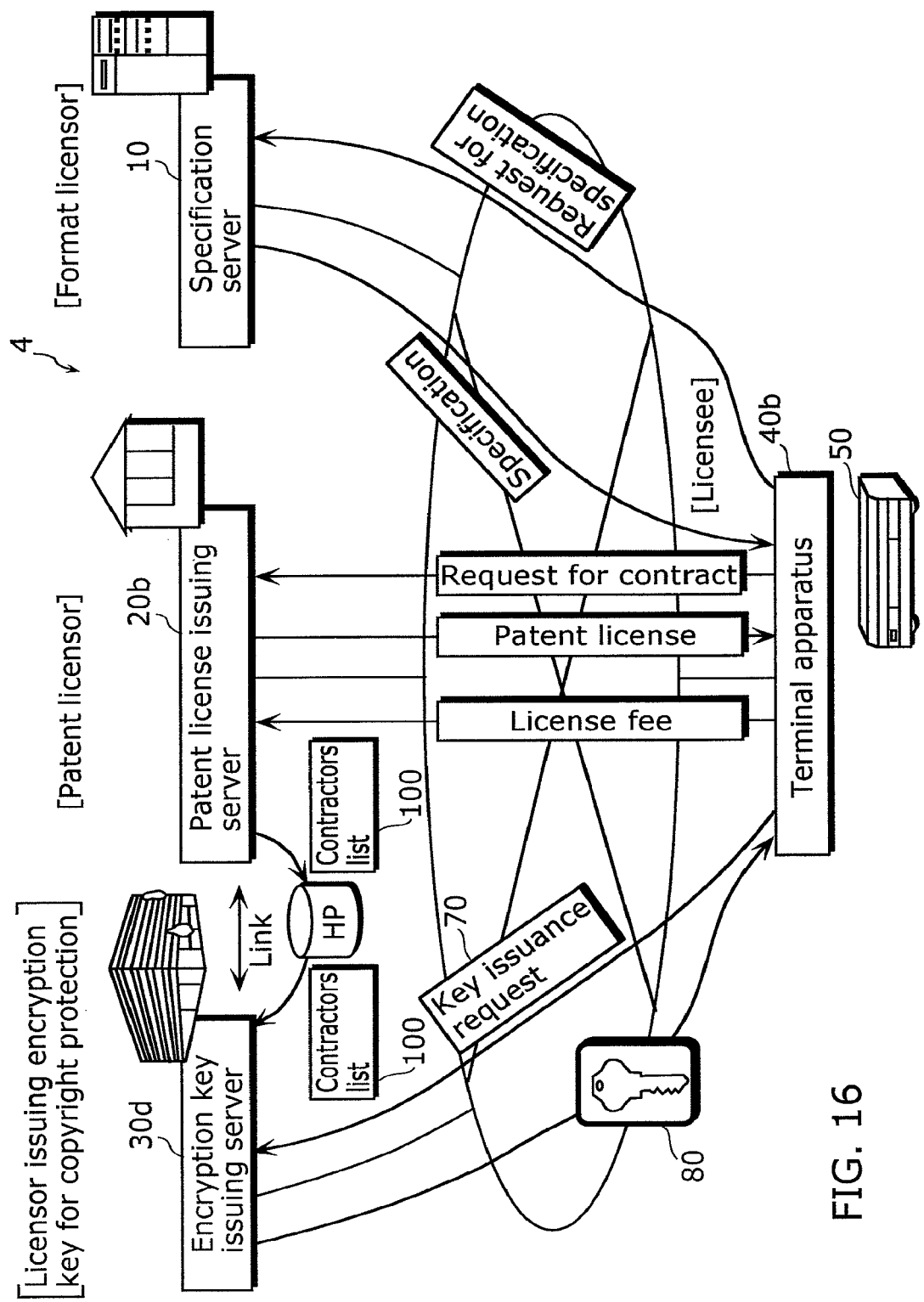
FIG. 16 is a diagram showing the entire structure of a system in a fourth embodiment.

Note that in the design information providing system 3 in the third embodiment, the patent license issuing server 20b distributes the contractors list 100 directly to the encryption key issuing server 30c; however, as in a design information providing system 4 that is shown in FIG. 16, the patent license issuing server 20b may also upload the contractors list 100 onto a website so that the other-company license link management DB32 in an encryption key issuing server 30d may download the contractors list 100 from the website. In this case, it is sufficient that the patent license issuing server 20b notifies, in advance, the encryption key issuing server 30d of the URL of the website on which the contractors list 100 is present, and the other-company license link management DB32 of the encryption key issuing server 30d downloads the contractors list 100 on a timely basis of executing the step S23 according to the instruction of the control unit 35.

INDUSTRIAL APPLICABILITY

The design information providing system according to the present invention is applicable to the manufacturing of DVD players and BD players.

The invention claimed is:
1. A design information providing system comprising:
a terminal apparatus used by a user manufacturing a product;
a first design information providing server and a second design information providing server; and
a patent license issuing server which concludes a license contract with said terminal apparatus regarding a patent necessary for manufacturing the product,
wherein said design information providing system connects said terminal apparatus, said first and second design information providing servers, and said patent license issuing server so as to allow mutual communication therebetween,
wherein said first design information providing server transmits, to said terminal apparatus, first design information indicating a specification necessary for manufacturing the product,
wherein said patent license issuing server includes:
a confirmation information generating unit configured to conclude, with said terminal apparatus, a license contract for a patent regarding the first design information, and to generate confirmation information for confirming the conclusion of the license contract, the confirmation information including a quantity of the concluded license contract as a contracted quantity; and
a confirmation information output unit configured to output the confirmation information generated by said confirmation information generating unit, and
wherein said second design information providing server includes:
a communication unit configured to receive, from said terminal apparatus, request information for requesting issuance of an encryption key that is second design information necessary for manufacturing the product and unique to the product, the request information including, as a requested quantity, a quantity of the encryption key requested to be issued;
an issuing unit configured to issue the requested quantity of the encryption key to said terminal apparatus that has transmitted the request information;
a confirmation information obtaining unit configured to obtain, from said terminal apparatus, the confirmation information outputted by said confirmation information output unit included in said patent license issuing server; and
a control unit configured to (i) determine, when said communication unit receives the request information, whether or not said confirmation information obtaining unit has obtained the confirmation information from said terminal apparatus that has transmitted the request information, (ii) stop the issuance of the requested quantity of the encryption key by said issuance unit when said confirmation information obtaining unit has not obtained the confirmation information from said terminal apparatus that has transmitted the request information, and (iii) compare the requested quantity of the encryption key included in the request information and the contracted quantity included in the conformation information when said confirmation information obtaining unit has obtained the confirmation information from said terminal apparatus that has transmitted the request information, determine whether or not the requested quantity is smaller than or equal to the contracted quantity, and stop the issuance of the requested quantity of the encryption key by said issuing unit when the requested quantity is not smaller than or equal to the contracted quantity.

2. The design information providing system according to claim 1,
wherein said second design information providing server further includes a revocation unit configured to revoke the encryption key to said terminal apparatus with which the conclusion of the license contract cannot be confirmed.

3. The design information providing system according to claim 1,
wherein said confirmation information generating unit in said patent license issuing server is configured to generate the confirmation information in the case where a license fee is paid for the patent regarding the first design information, and said second design information providing server issues the encryption key in the case where a license fee is paid for the encryption key.

4. The design information providing system according to claim 1, wherein said control unit is further configured to cause said communication unit to transmit a message prompting conclusion of the license contract with said patent license issuing server, to said terminal apparatus with which the conclusion of the license contract cannot be confirmed by the confirmation information.

5. The design information providing system according to claim 1, wherein when the requested quantity is not smaller than or equal to the contracted quantity and a total quantity of the encryption key that has been issued so far is smaller than the contracted quantity, said control unit is configured to cause said issuing unit to issue the encryption key in a quantity equivalent to a difference between the contracted quantity and the total quantity and stop the issuance of a quantity of the encryption key exceeding the contracted quantity.

6. A design information providing server comprising:

a communication unit configured to receive, from a terminal apparatus of a user manufacturing a product, request information for requesting issuance of an encryption key that is second design information necessary for manufacturing the product and unique to the product, the request information including, as a requested quantity, a quantity of the encryption key requested to be issued;

an issuing unit configured to issue the requested quantity of the encryption key to the terminal apparatus that has transmitted the request information;

a confirmation information obtaining unit configured to obtain, from the terminal apparatus, confirmation information for confirming a conclusion of a license contract, between the terminal apparatus and a patent license issuing server, for a patent regarding first design information indicating a specification necessary for manufacturing the product, the confirmation information including a quantity of the concluded license contract as a contracted quantity; and a control unit configured to (i) determine, when said communication unit receives the request information, whether or not said confirmation information obtaining unit has obtained the confirmation information from the terminal apparatus that has transmitted the request information, (ii) stop the issuance of the requested quantity of the encryption key by said issuing unit when said confirmation information obtaining unit has not obtained the confirmation information from the terminal apparatus that has transmitted the request information, and (iii) compare the requested quantity of the encryption key included in the request information and the contracted quantity included in the confirmation information when said confirmation information obtaining unit has obtained the confirmation information from the terminal apparatus that has transmitted the request information, determine whether or not the requested quantity is smaller than or equal to the contracted quantity, and stop the issuance of the requested quantity of the encryption key by said issuing unit when the requested quantity is not smaller than or equal to the contracted quantity.

7. A design information providing method comprising:

receiving, from a terminal apparatus of a user manufacturing a product, request information for requesting issuance of an encryption key that is second design information necessary for manufacturing the product and unique to the product, the request information including, as a requested quantity, a quantity of the encryption key requested to be issued;

issuing the requested quantity of the encryption key to the terminal apparatus that has transmitted the request information;

obtaining, from the terminal apparatus, confirmation information for confirming a conclusion of a license contract, between the terminal apparatus and a patent license issuing server, for a patent regarding first design information indicating a specification necessary for manufacturing the product, the confirmation information including a quantity of the concluded license contact as a contracted quantity;

determining, when the request information is received in said receiving, whether or not the confirmation information is obtained, in said obtaining, from the terminal apparatus that has transmitted the request information in said obtaining;

stopping the issuance of the requested quantity of the encryption key in said issuing when the confirmation information is not obtained, in said obtaining, from the terminal apparatus that has transmitted the request information; and comparing the requested quantity of the encryption key included in the request information and the contracted quantity included in the confirmation information when the confirmation information is obtained in said obtaining from the terminal apparatus that has transmitted the request information, determining whether or not the requested quantity is smaller than or equal to the contracted quantity, and stopping the issuance of the requested quantity of the encryption key in said issuing when the requested quantity is not smaller than or equal to the contracted quantity.

8. A non-transitory computer-readable recording medium having a program recorded thereon, the program causing a computer to execute the design information providing method of claim 7.

* * * * *